US009721344B2

(12) United States Patent
Wajs

(10) Patent No.: US 9,721,344 B2
(45) Date of Patent: Aug. 1, 2017

(54) MULTI-APERTURE DEPTH MAP USING PARTIAL BLURRING

(71) Applicant: Dual Aperture International Co. Ltd., Seongnam-si, Gyeonggi-Do (KR)

(72) Inventor: Andrew Wajs, Haarlem (NL)

(73) Assignee: Dual Aperture International Co., Ltd., Seongnam-si (KR)

(\*) Notice: Subject to any disclaimer, the term of this patent is extended or adjusted under 35 U.S.C. 154(b) by 0 days.

(21) Appl. No.: 15/162,154

(22) Filed: May 23, 2016

(65) Prior Publication Data

US 2016/0269710 A1 Sep. 15, 2016

Related U.S. Application Data

(63) Continuation of application No. 14/832,062, filed on Aug. 21, 2015.
(Continued)

(51) Int. Cl.
| | |
|---|---|
| *H04N 7/18* | (2006.01) |
| *G06T 7/00* | (2017.01) |
| *H04N 13/00* | (2006.01) |
| *G06T 7/60* | (2017.01) |
| *H04N 5/222* | (2006.01) |

(Continued)

(52) U.S. Cl.
CPC ............ *G06T 7/0051* (2013.01); *G06T 5/003* (2013.01); *G06T 7/571* (2017.01); *G06T 7/60* (2013.01); *H04N 5/2226* (2013.01); *H04N 9/07* (2013.01); *H04N 13/0018* (2013.01); *H04N 13/0037* (2013.01); *H04N 13/0217* (2013.01); *H04N 13/0257* (2013.01); *G06T 2200/04* (2013.01); *G06T 2207/10024* (2013.01); *G06T 2207/10028* (2013.01); *G06T 2207/10048* (2013.01); *G06T 2207/10148* (2013.01); *G06T 2207/10152* (2013.01); *G06T 2207/20021* (2013.01); *G06T 2207/20024* (2013.01);
(Continued)

(58) Field of Classification Search
CPC ..... G06T 7/0051; G06T 7/0085; H04N 5/332; H04N 13/0037
USPC ............... 348/49, 149, 152; 38/49, 135, 142
See application file for complete search history.

(56) References Cited

U.S. PATENT DOCUMENTS

| | | |
|---|---|---|
| 2,921,509 A | 1/1960 | Freund |
| 3,971,065 A | 7/1976 | Bayer |

(Continued)

FOREIGN PATENT DOCUMENTS

| | | |
|---|---|---|
| CN | 1610412 A | 4/2005 |
| EP | 0318188 A2 | 5/1989 |

(Continued)

OTHER PUBLICATIONS

United States Office Action, U.S. Appl. No. 14/832,062, Jun. 3, 2016, 11 pages.
(Continued)

*Primary Examiner* — Farzana Hossain
(74) *Attorney, Agent, or Firm* — Fenwick & West LLP

(57) ABSTRACT

The present disclosure overcomes the limitations of the prior art by using partial blur kernels, rather than using full blur kernels. For example, single-sided blur kernels may be used in order to accommodate different edge orientations. In one aspect, the single-sided blur kernels may be used in order to accommodate edges caused by occlusions, where the two sides of the edge are at different depths.

17 Claims, 13 Drawing Sheets

Related U.S. Application Data

(60) Provisional application No. 62/121,203, filed on Feb. 26, 2015.

(51) Int. Cl.
*H04N 9/07* (2006.01)
*G06T 5/00* (2006.01)
*G06T 7/571* (2017.01)
*H04N 5/33* (2006.01)
*H04N 13/02* (2006.01)

(52) U.S. Cl.
CPC .... *G06T 2207/20192* (2013.01); *H04N 5/332* (2013.01); *H04N 13/021* (2013.01); *H04N 2013/0081* (2013.01)

(56) References Cited

U.S. PATENT DOCUMENTS

| | | | |
|---|---|---|---|
| 4,651,001 A | 3/1987 | Harada et al. | |
| 4,878,113 A | 10/1989 | Nakamura | |
| 4,965,840 A | 10/1990 | Subbarao | |
| 4,987,295 A | 1/1991 | Kinnard et al. | |
| 5,148,209 A | 9/1992 | Subbarao | |
| 5,231,443 A | 7/1993 | Subbarao | |
| 5,280,388 A | 1/1994 | Okayama et al. | |
| 5,631,703 A | 5/1997 | Hamilton, Jr. et al. | |
| 5,998,090 A | 12/1999 | Sabnis et al. | |
| 6,008,484 A | 12/1999 | Woodgate et al. | |
| 6,034,372 A | 3/2000 | LeVan | |
| 6,292,212 B1 | 9/2001 | Zigadlo et al. | |
| 6,316,284 B1 | 11/2001 | Perregaux et al. | |
| 6,393,160 B1 | 5/2002 | Edgar | |
| 6,459,450 B2 | 10/2002 | Bawolek et al. | |
| 6,590,679 B1 | 7/2003 | Edgar et al. | |
| 6,632,701 B2 | 10/2003 | Merrill | |
| 6,727,521 B2 | 4/2004 | Merrill | |
| 6,768,565 B1 | 7/2004 | Perregaux et al. | |
| 6,771,314 B1 | 8/2004 | Bawolek et al. | |
| 6,783,900 B2 | 8/2004 | Venkataraman | |
| 6,930,336 B1 | 8/2005 | Merrill | |
| 6,998,660 B2 | 2/2006 | Lyon et al. | |
| 7,053,908 B2 | 5/2006 | Saquib et al. | |
| 7,053,928 B1 | 5/2006 | Connors et al. | |
| 7,057,654 B2 | 6/2006 | Roddy et al. | |
| 7,072,508 B2 | 7/2006 | Dance | |
| 7,123,298 B2 | 10/2006 | Schroeder et al. | |
| 7,132,724 B1 | 11/2006 | Merrill | |
| 7,164,444 B1 | 1/2007 | Merrill | |
| 7,176,962 B2 | 2/2007 | Ejima | |
| 7,199,348 B2 | 4/2007 | Olsen et al. | |
| 7,224,540 B2 | 5/2007 | Olmstead | |
| 7,247,851 B2 | 7/2007 | Okada et al. | |
| 7,248,297 B2 | 7/2007 | Catrysse et al. | |
| 7,269,295 B2 | 9/2007 | Keshet et al. | |
| 7,274,383 B1 | 9/2007 | Brown Elliot | |
| 7,400,458 B2 | 7/2008 | Farr | |
| 7,579,577 B2 | 8/2009 | Ono | |
| 7,773,317 B2 | 8/2010 | Duparre | |
| 8,018,509 B2 | 9/2011 | Numata | |
| 8,406,564 B2 * | 3/2013 | Sun .................. | G06T 5/003 382/240 |
| 8,467,088 B2 | 6/2013 | Hosaka | |
| 8,917,349 B2 | 12/2014 | Wajs | |
| 9,077,916 B2 | 7/2015 | Wajs | |
| 2001/0033326 A1 | 10/2001 | Goldstein et al. | |
| 2002/0149691 A1 | 10/2002 | Pereira et al. | |
| 2002/0171740 A1 | 11/2002 | Seo | |
| 2002/0186976 A1 | 12/2002 | Seo | |
| 2003/0052992 A1 | 3/2003 | Nakata | |
| 2003/0112353 A1 | 6/2003 | Morris | |
| 2004/0097021 A1 | 5/2004 | Augusto et al. | |
| 2004/0169749 A1 | 9/2004 | Acharya | |
| 2004/0174446 A1 | 9/2004 | Acharya | |
| 2004/0246338 A1 | 12/2004 | Lieberman et al. | |
| 2004/0252867 A1 | 12/2004 | Lan et al. | |
| 2005/0046969 A1 | 3/2005 | Beatson et al. | |
| 2005/0088550 A1 | 4/2005 | Mitsunaga et al. | |
| 2005/0146634 A1 | 7/2005 | Silverstein | |
| 2005/0157376 A1 | 7/2005 | Huibers et al. | |
| 2006/0071156 A1 | 4/2006 | Masaki | |
| 2006/0132642 A1 | 6/2006 | Hosaka et al. | |
| 2006/0171704 A1 | 8/2006 | Bingle et al. | |
| 2006/0182364 A1 | 8/2006 | John | |
| 2006/0197006 A1 | 9/2006 | Kochi | |
| 2006/0221216 A1 | 10/2006 | Hattori | |
| 2006/0261280 A1 | 11/2006 | Oon et al. | |
| 2006/0285741 A1 | 12/2006 | Subbarao | |
| 2007/0019087 A1 | 1/2007 | Kuno et al. | |
| 2007/0024614 A1 | 2/2007 | Tam et al. | |
| 2007/0035852 A1 | 2/2007 | Farr | |
| 2007/0102622 A1 | 5/2007 | Olsen et al. | |
| 2007/0127908 A1 | 6/2007 | Oon et al. | |
| 2007/0133983 A1 | 6/2007 | Traff | |
| 2007/0145273 A1 | 6/2007 | Chang | |
| 2007/0153099 A1 | 7/2007 | Ohki et al. | |
| 2007/0183049 A1 | 8/2007 | Cieslinski | |
| 2007/0183680 A1 | 8/2007 | Aguilar | |
| 2007/0189750 A1 | 8/2007 | Wong et al. | |
| 2007/0201738 A1 | 8/2007 | Toda et al. | |
| 2008/0013943 A1 | 1/2008 | Rohaly et al. | |
| 2008/0055400 A1 | 3/2008 | Schechterman et al. | |
| 2008/0297648 A1 | 12/2008 | Furuki et al. | |
| 2008/0308712 A1 | 12/2008 | Ono | |
| 2008/0316345 A1 | 12/2008 | Onodera | |
| 2009/0015979 A1 | 1/2009 | Fukano et al. | |
| 2009/0102956 A1 | 4/2009 | Georgiev | |
| 2009/0115780 A1 | 5/2009 | Varekamp et al. | |
| 2009/0159799 A1 | 6/2009 | Copeland | |
| 2009/0175535 A1 | 7/2009 | Mattox | |
| 2009/0268895 A1 | 10/2009 | Emerson | |
| 2009/0285476 A1 | 11/2009 | Choe et al. | |
| 2010/0033604 A1 | 2/2010 | Solomon | |
| 2010/0033617 A1 * | 2/2010 | Forutanpour ......... | G06T 7/0067 348/345 |
| 2010/0066854 A1 | 3/2010 | Mather et al. | |
| 2010/0157019 A1 | 6/2010 | Schwotzer et al. | |
| 2010/0225755 A1 | 9/2010 | Tamaki et al. | |
| 2010/0238343 A1 | 9/2010 | Kawarada | |
| 2010/0309350 A1 | 12/2010 | Adams et al. | |
| 2011/0064327 A1 | 3/2011 | Dagher et al. | |
| 2011/0069189 A1 | 3/2011 | Venkataraman et al. | |
| 2011/0080487 A1 | 4/2011 | Venkataraman et al. | |
| 2012/0008023 A1 | 1/2012 | Wajs | |
| 2012/0140099 A1 | 6/2012 | Kim et al. | |
| 2012/0154596 A1 | 6/2012 | Wajs | |
| 2012/0155785 A1 * | 6/2012 | Banner .................. | G06T 5/003 382/264 |
| 2012/0189293 A1 | 7/2012 | Cao et al. | |
| 2012/0249833 A1 | 10/2012 | Li | |
| 2012/0281072 A1 | 11/2012 | Georgiev et al. | |
| 2013/0016220 A1 | 1/2013 | Brown | |
| 2013/0033578 A1 | 2/2013 | Wajs | |
| 2013/0033579 A1 | 2/2013 | Wajs | |
| 2013/0063566 A1 * | 3/2013 | Morgan-Mar ......... | G06T 7/0069 348/46 |
| 2013/0107002 A1 | 5/2013 | Kikuchi | |
| 2013/0107010 A1 | 5/2013 | Hoiem et al. | |
| 2013/0176396 A1 | 7/2013 | Cohen et al. | |
| 2013/0307933 A1 | 11/2013 | Znamenskiy et al. | |
| 2014/0078376 A1 | 3/2014 | Shuster | |
| 2014/0152886 A1 | 6/2014 | Morgan-Mar et al. | |
| 2015/0261299 A1 * | 9/2015 | Wajs ..................... | G06F 3/011 726/19 |
| 2016/0255323 A1 * | 9/2016 | Wajs ..................... | G06T 7/0051 |
| 2016/0267667 A1 * | 9/2016 | Wajs ..................... | G06T 7/0051 |
| 2016/0269600 A1 * | 9/2016 | Wajs ..................... | G06T 7/0051 |
| 2016/0269710 A1 | 9/2016 | Wajs | |

FOREIGN PATENT DOCUMENTS

| | | |
|---|---|---|
| EP | 0858208 A1 | 8/1998 |
| GB | 2034971 A | 6/1980 |

(56) References Cited

FOREIGN PATENT DOCUMENTS

| | | | |
|---|---|---|---|
| GB | 2463480 A | 3/2010 | |
| JP | 5552277 S | 4/1980 | |
| JP | H08-140116 A | 5/1996 | |
| JP | 2002-207159 A | 7/2002 | |
| JP | 2007-174277 A | 7/2007 | |
| JP | 2008-005213 A | 1/2008 | |
| JP | 2008-252639 A | 10/2008 | |
| JP | 2008-268868 A | 11/2008 | |
| JP | 2009-232348 A | 10/2009 | |
| WO | WO 0172033 A1 | 9/2001 | |
| WO | WO 02/059692 A1 | 8/2002 | |
| WO | WO 2007/015982 A2 | 2/2007 | |
| WO | WO 2007/104829 A1 | 9/2007 | |
| WO | WO 2008/036769 A2 | 3/2008 | |
| WO | WO 2009/097552 A1 | 8/2009 | |
| WO | WO 2010/081556 A1 | 7/2010 | |
| WO | WO 2011/023224 A1 | 3/2011 | |
| WO | WO 2011/101035 A1 | 8/2011 | |
| WO | WO 2011/101036 A1 | 8/2011 | |
| WO | WO 2014/008939 A1 | 1/2014 | |
| WO | WO2014008939 * | 1/2014 | G06F 3/01 |

OTHER PUBLICATIONS

United States Office Action, U.S. Appl. No. 14/832,062, Jan. 22, 2016, 12 pages.

United States Office Action, U.S. Appl. No. 15/162,147, Nov. 21, 2016, 21 pages.

United States Office Action, U.S. Appl. No. 15/163,435, Nov. 21, 2016, 21 pages.

U.S. Office Action, U.S. Appl. No. 15/162,147, dated Mar. 28, 2017, 13 pages.

\* cited by examiner

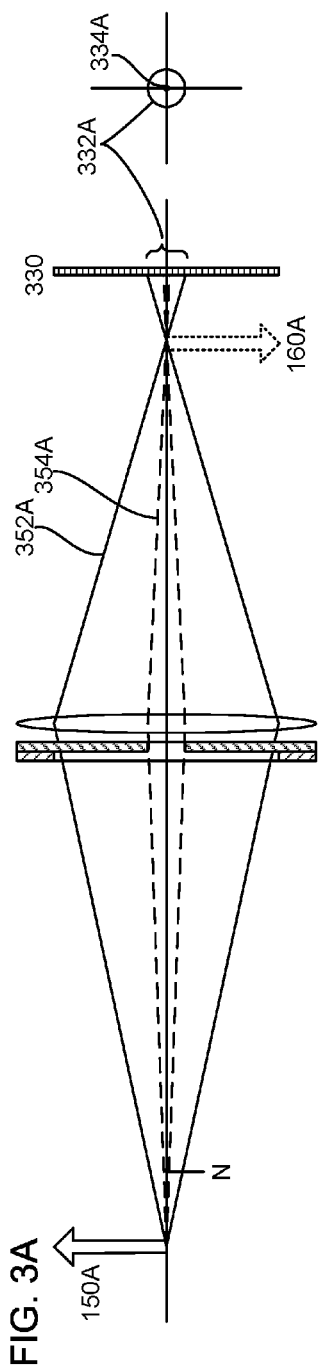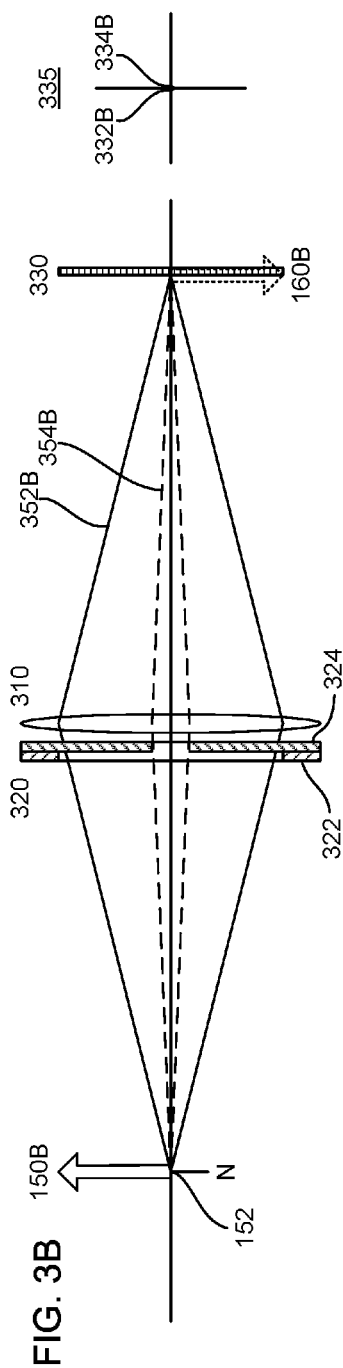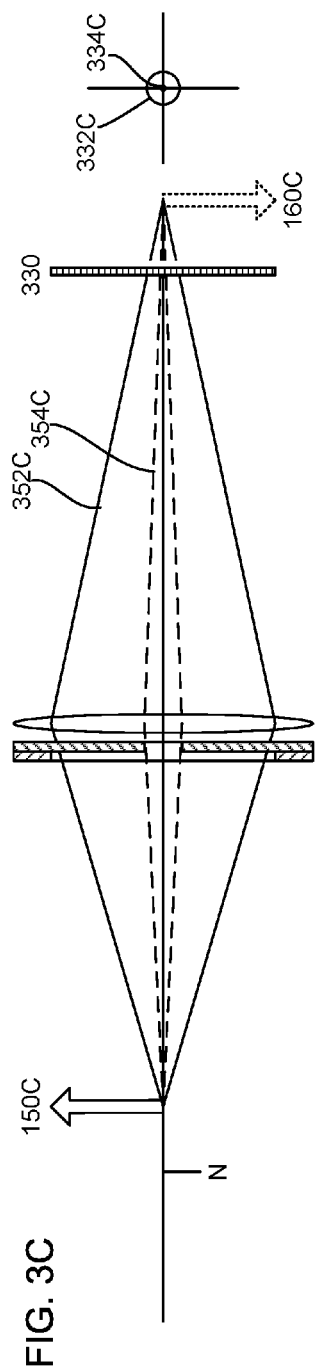

| Object distance | IR blur spot: $PSF_{ir}$ | color blur spot: $PSF_{vis}$ | blur kernel B |
|---|---|---|---|
| $s_1$ | • | • | • |
| $s_2$ | • | ○ | ○ |
| $s_3$ | • | ○ | ○ |
| $s_4$ | • | ○ | ○ |
| $s_5$ | • | ○ | ○ |
| $s_6$ | • | ○ | ○ |

MULTI-APERTURE DEPTH MAP USING PARTIAL BLURRING

CROSS-REFERENCE TO RELATED APPLICATION(S)

This application is a continuation of U.S. patent application Ser. No. 14/832,062, "Multi-Aperture Depth Map Using Blur Kernels and Down-Sampling," filed Aug. 21, 2015; which claims priority under 35 U.S.C. §119(e) to U.S. Provisional Patent Application Ser. No. 62/121,203, "Dual-Aperture Depth Map Using Adaptive PSF Sizing," filed Feb. 26, 2015. The subject matter of all of the foregoing is incorporated herein by reference in their entirety.

BACKGROUND

1. Field of the Invention

This invention relates to a multi-aperture imaging system that uses multiple apertures of different f-numbers to estimate depth of an object.

2. Description of Related Art

A dual-aperture camera has two apertures. A narrow aperture, typically at one spectral range such as infrared (IR), produces relatively sharp images over a long depth of focus. A wider aperture, typically at another spectral range such as RGB, produces sometimes blurred images for out of focus objects. The pairs of images captured using the two different apertures can be processed to generate distance information of an object, for example as described in U.S. patent application Ser. No. 13/579,568, which is incorporated herein by reference. However, conventional processing methods can be computationally expensive.

Therefore, there is a need to improve approaches for depth map generation.

SUMMARY

The present disclosure overcomes the limitations of the prior art by using partial blurring over less than 360 degrees, for example single-sided blur kernels, rather than using full blurring in all directions. For example, a first image may contain an edge and a second image may contain the same edge as the first image. The two images may be captured by imaging systems with blur characteristics that vary differently as a function of object depth. For example, a dual-aperture system may simultaneously capture a faster f-number visible image and a slower f-number infrared image. Depth information may be generated by comparing blurring of one side of the same edge in the two images.

In one aspect, single-sided blur kernels are used to accommodate edges, for example edges caused by occlusions where the two sides of the edge are at different depths. In such a case, one side of the edge is at a closer object distance and the other side is at a further object distance. The two different object distances correspond to different blur kernels. Applying a full blur kernel to both sides of the edge will not give good results, because when one side is matched to the blur kernel, the other side will not be. Single-sided blur kernels can be used instead. One single-sided blur kernel may be used for one side of the edge, and a different single-sided blur kernel may be used for the other side of the edge.

In other aspects, single-sided blur kernels and edges may be processed to reduce the required computation. For example, blurring may be estimated by convolution. This may be simplified by binarizing the edges, reducing the window and/or blur kernel sizes, and/or using only mathematical summing operations. Binarized edges can be used to reduce computationally expensive convolutions into simpler summing operations. Edges may first be normalized to phase match and/or equate energies between the two images.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

FIGS. 3A-3C depict operation of a multi-aperture imaging system according to one embodiment of the invention.

FIGS. 9A-9E illustrate a simplified approach for convolution of binarized edges.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

Figure 1:
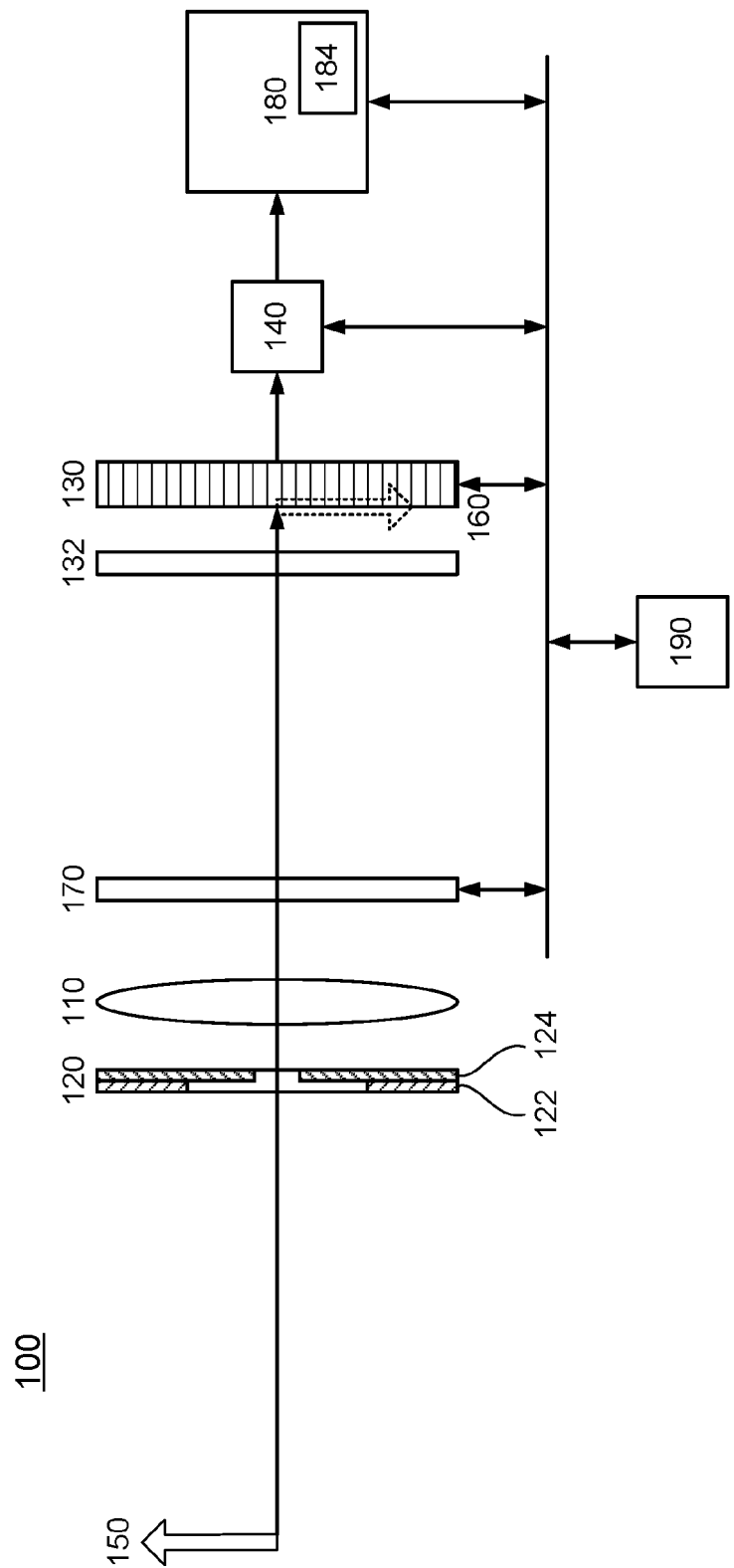
FIG. 1 is a block diagram of a multi-aperture, shared sensor imaging system according to one embodiment of the invention.

FIG. 1 is a block diagram of a multi-aperture, shared sensor imaging system 100 according to one embodiment of the invention. The imaging system may be part of a digital camera or integrated in a mobile phone, a webcam, a biometric sensor, image scanner or any other multimedia device requiring image-capturing functionality. The system depicted in FIG. 1 includes imaging optics 110 (e.g., a lens and/or mirror system), a multi-aperture system 120 and an image sensor 130. The imaging optics 110 images objects 150 from a scene onto the image sensor. In FIG. 1, the object 150 is in focus, so that the corresponding image 160 is located at the plane of the sensor 130. As described below, this will not always be the case. Objects that are located at other depths will be out of focus at the image sensor 130.

The multi-aperture system 120 includes at least two apertures, shown in FIG. 1 as apertures 122 and 124. In this example, aperture 122 is the aperture that limits the propagation of visible light, and aperture 124 limits the propagation of infrared or other non-visible light. In this example, the two apertures 122, 124 are placed together but they could also be separated. This type of multi-aperture system 120 may be implemented by wavelength-selective optical components, such as wavelength filters. As used in this disclosure, terms such as "light" "optics" and "optical" are not meant to be limited to the visible part of the electromagnetic spectrum but to also include other parts of the electromagnetic spectrum where imaging may occur, including wavelengths that are shorter than visible (e.g., ultraviolet) and wavelengths that are longer than visible (e.g., infrared).

The sensor 130 detects both the visible image corresponding to aperture 122 and the infrared image corresponding to aperture 124. In effect, there are two imaging systems that share a single sensor array 130: a visible imaging system using optics 110, aperture 122 and sensor 130; and an infrared imaging system using optics 110, aperture 124 and sensor 130. The imaging optics 110 in this example is fully shared by the two imaging systems, but this is not required. In addition, the two imaging systems do not have to be visible and infrared. They could be other spectral combinations: red and green, or infrared and white (i.e., visible but without color), for example.

The exposure of the image sensor 130 to electromagnetic radiation is typically controlled by a shutter 170 and the apertures of the multi-aperture system 120. When the shutter 170 is opened, the aperture system controls the amount of light and the degree of collimation of the light exposing the image sensor 130. The shutter 170 may be a mechanical shutter or, alternatively, the shutter may be an electronic shutter integrated in the image sensor. The image sensor 130 typically includes rows and columns of photosensitive sites (pixels) forming a two dimensional pixel array. The image sensor may be a CMOS (complementary metal oxide semiconductor) active pixel sensor or a CCD (charge coupled device) image sensor. Alternatively, the image sensor may relate to other Si (e.g. a-Si), III-V (e.g. GaAs) or conductive polymer based image sensor structures.

When the light is projected by the imaging optics 110 onto the image sensor 130, each pixel produces an electrical signal, which is indicative of the electromagnetic radiation (energy) incident on that pixel. In order to obtain color information and to separate the color components of an image which is projected onto the imaging plane of the image sensor, typically a color filter array 132 is interposed between the imaging optics 110 and the image sensor 130. The color filter array 132 may be integrated with the image sensor 130 such that each pixel of the image sensor has a corresponding pixel filter. Each color filter is adapted to pass light of a predetermined color band onto the pixel. Usually a combination of red, green and blue (RGB) filters is used. However other filter schemes are also possible, e.g. CYGM (cyan, yellow, green, magenta), RGBE (red, green, blue, emerald), etc. Alternately, the image sensor may have a stacked design where red, green and blue sensor elements are stacked on top of each other rather than relying on individual pixel filters.

Each pixel of the exposed image sensor 130 produces an electrical signal proportional to the electromagnetic radiation passed through the color filter 132 associated with the pixel. The array of pixels thus generates image data (a frame) representing the spatial distribution of the electromagnetic energy (radiation) passed through the color filter array 132. The signals received from the pixels may be amplified using one or more on-chip amplifiers. In one embodiment, each color channel of the image sensor may be amplified using a separate amplifier, thereby allowing to separately control the ISO speed for different colors.

Further, pixel signals may be sampled, quantized and transformed into words of a digital format using one or more analog to digital (A/D) converters 140, which may be integrated on the chip of the image sensor 130. The digitized image data are processed by a processor 180, such as a digital signal processor (DSP) coupled to the image sensor, which is configured to perform well known signal processing functions such as interpolation, filtering, white balance, brightness correction, and/or data compression techniques (e.g. MPEG or JPEG type techniques).

The processor 180 may include signal processing functions 184 for obtaining depth information associated with an image captured by the multi-aperture imaging system. These signal processing functions may provide a multi-aperture imaging system with extended imaging functionality including variable depth of focus, focus control and stereoscopic 3D image viewing capabilities. The details and the advantages associated with these signal processing functions will be discussed hereunder in more detail.

The processor 180 may also be coupled to additional compute resources, such as additional processors, storage memory for storing captured images and program memory for storing software programs. A controller 190 may also be used to control and coordinate operation of the components in imaging system 100. Functions described as performed by the processor 180 may instead be allocated among the processor 180, the controller 190 and additional compute resources.

As described above, the sensitivity of the imaging system 100 is extended by using infrared imaging functionality. To that end, the imaging optics 110 may be configured to allow both visible light and infrared light or at least part of the infrared spectrum to enter the imaging system. Filters located at the entrance aperture of the imaging optics 110 are configured to allow at least part of the infrared spectrum to enter the imaging system. In particular, imaging system 100 typically would not use infrared blocking filters, usually referred to as hot-mirror filters, which are used in conventional color imaging cameras for blocking infrared light from entering the camera. Hence, the light entering the multi-aperture imaging system may include both visible light and infrared light, thereby allowing extension of the photo-response of the image sensor to the infrared spectrum. In cases where the multi-aperture imaging system is based on spectral combinations other than visible and infrared, corresponding wavelength filters would be used.

Figure 2A:
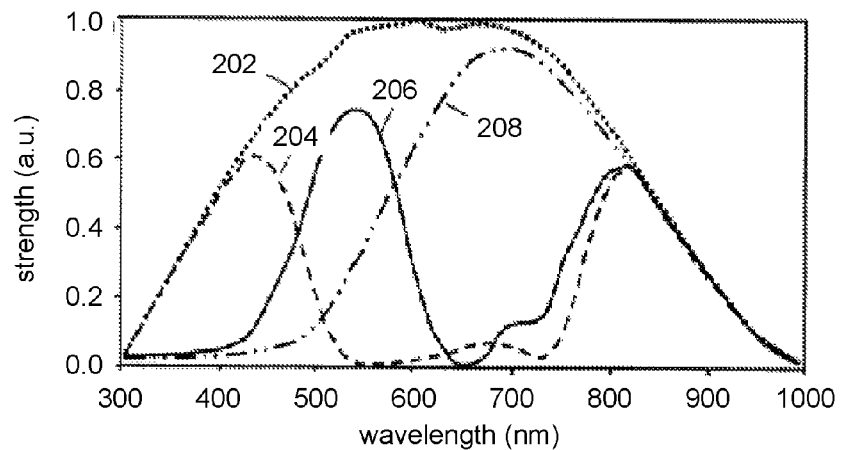
FIG. 2A is a graph illustrating the spectral responses of a digital camera.
Figure 2B:
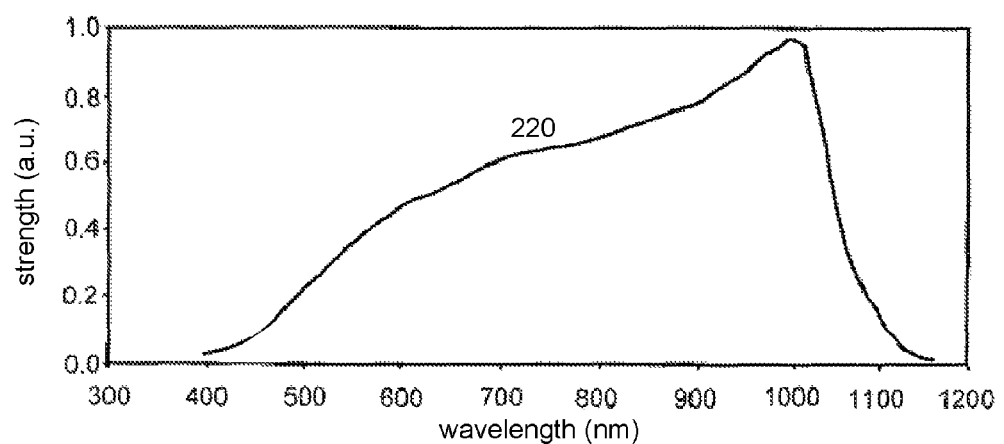
FIG. 2B is a graph illustrating the spectral sensitivity of silicon.

FIGS. 2A and 2B are graphs showing the spectral responses of a digital camera. In FIG. 2A, curve 202 represents a typical color response of a digital camera without an infrared blocking filter (hot mirror filter). As can be seen, some infrared light passes through the color pixel filters. FIG. 2A shows the photo-responses of a conventional blue pixel filter 204, green pixel filter 206 and red pixel filter 208. The color pixel filters, in particular the red pixel filter, may transmit infrared light so that a part of the pixel signal may be attributed to the infrared. FIG. 2B depicts the response 220 of silicon (i.e. the main semiconductor component of an image sensor used in digital cameras). The sensitivity of a silicon image sensor to infrared radiation is approximately four times higher than its sensitivity to visible light.

In order to take advantage of the spectral sensitivity provided by the image sensor as illustrated by FIGS. 2A and 2B, the image sensor 130 in the imaging system in FIG. 1 may be a conventional image sensor. In a conventional RGB sensor, the infrared light is mainly sensed by the red pixels. In that case, the DSP 180 may process the red pixel signals in order to extract the low-noise infrared information. Alternatively, the image sensor may be especially configured for imaging at least part of the infrared spectrum. The image sensor may include, for example, one or more infrared (I) pixels in addition to the color pixels, thereby allowing the image sensor to produce a RGB color image and a relatively low-noise infrared image.

An infrared pixel may be realized by covering a pixel with a filter material, which substantially blocks visible light and substantially transmits infrared light, preferably infrared light within the range of approximately 700 through 1100 nm. The infrared transmissive pixel filter may be provided in an infrared/color filter array (ICFA) may be realized using well known filter materials having a high transmittance for wavelengths in the infrared band of the spectrum, for example a black polyimide material sold by Brewer Science under the trademark "DARC 400".

Such filters are described in more detail in US2009/0159799, "Color infrared light sensor, camera and method for capturing images," which is incorporated herein by reference. In one design, an ICFA contain blocks of pixels, e.g. a block of 2×2 pixels, where each block comprises a red, green, blue and infrared pixel. When exposed, such an ICFA image sensor produces a raw mosaic image that includes both RGB color information and infrared information. After processing the raw mosaic image, a RGB color image and an infrared image may be obtained. The sensitivity of such an ICFA image sensor to infrared light may be increased by increasing the number of infrared pixels in a block. In one configuration (not shown), the image sensor filter array uses blocks of sixteen pixels, with four color pixels (RGGB) and twelve infrared pixels.

Instead of an ICFA image sensor (where color pixels are implemented by using color filters for individual sensor pixels), in a different approach, the image sensor 130 may use an architecture where each photo-site includes a number of stacked photodiodes. Preferably, the stack contains four stacked photodiodes responsive to the primary colors RGB and infrared, respectively. These stacked photodiodes may be integrated into the silicon substrate of the image sensor.

The multi-aperture system, e.g. a multi-aperture diaphragm, may be used to improve the depth of field (DOF) or other depth aspects of the camera. The DOF determines the range of distances from the camera that are in focus when the image is captured. Within this range the object is acceptably sharp. For moderate to large distances and a given image format, DOF is determined by the focal length of the imaging optics N, the f-number associated with the lens opening (the aperture), and/or the object-to-camera distance s. The wider the aperture (the more light received) the more limited the DOF. DOF aspects of a multi-aperture imaging system are illustrated in FIG. 3.

Consider first FIG. 3B, which shows the imaging of an object 150 onto the image sensor 330. Visible and infrared light may enter the imaging system via the multi-aperture system 320. In one embodiment, the multi-aperture system 320 may be a filter-coated transparent substrate. One filter coating 324 may have a central circular hole of diameter D1. The filter coating 324 transmits visible light and reflects and/or absorbs infrared light. An opaque cover 322 has a larger circular opening with a diameter D2. The cover 322 does not transmit either visible or infrared light. It may be a thin-film coating which reflects both infrared and visible light or, alternatively, the cover may be part of an opaque holder for holding and positioning the substrate in the optical system. This way, the multi-aperture system 320 acts as a circular aperture of diameter D2 for visible light and as a circular aperture of smaller diameter D1 for infrared light. The visible light system has a larger aperture and faster f-number than the infrared light system. Visible and infrared light passing the aperture system are projected by the imaging optics 310 onto the image sensor 330.

The pixels of the image sensor may thus receive a wider-aperture optical image signal 352B for visible light, overlaying a second narrower-aperture optical image signal 354B for infrared light. The wider-aperture visible image signal 352B will have a shorter DOF, while the narrower-aperture infrared image signal 354 will have a longer DOF. In FIG. 3B, the object 150B is located at the plane of focus N, so that the corresponding image 160B is in focus at the image sensor 330.

Objects 150 close to the plane of focus N of the lens are projected onto the image sensor plane 330 with relatively small defocus blur. Objects away from the plane of focus N are projected onto image planes that are in front of or behind the image sensor 330. Thus, the image captured by the image sensor 330 is blurred. Because the visible light 352B has a faster f-number than the infrared light 354B, the visible image will blur more quickly than the infrared image as the object 150 moves away from the plane of focus N. This is shown by FIGS. 3A and 3C and by the blur diagrams at the right of each figure.

Most of FIG. 3B shows the propagation of rays from object 150B to the image sensor 330. The righthand side of FIG. 3B also includes a blur diagram 335, which shows the blurs resulting from imaging of visible light and of infrared light from an on-axis point 152 of the object. In FIG. 3B, the on-axis point 152 produces a visible blur 332B that is relatively small and also produces an infrared blur 334B that is also relatively small. That is because, in FIG. 3B, the object is in focus.

FIGS. 3A and 3C show the effects of defocus. In FIG. 3A, the object 150A is located to one side of the nominal plane of focus N. As a result, the corresponding image 160A is formed at a location in front of the image sensor 330. The light travels the additional distance to the image sensor 330, thus producing larger blur spots than in FIG. 3B. Because the visible light 352A is a faster f-number, it diverges more quickly and produces a larger blur spot 332A. The infrared light 354 is a slower f-number, so it produces a blur spot 334A that is not much larger than in FIG. 3B. If the f-number is slow enough, the infrared blur spot may be assumed to be constant size across the range of depths that are of interest.

FIG. 3C shows the same effect, but in the opposite direction. Here, the object 150C produces an image 160C that would fall behind the image sensor 330. The image sensor 330 captures the light before it reaches the actual image plane, resulting in blurring. The visible blur spot 332C is larger due to the faster f-number. The infrared blur spot 334C grows more slowly with defocus, due to the slower f-number.

The DSP 180 may be configured to process and combine the captured color and infrared images. Improvements in the DOF and the ISO speed provided by a multi-aperture imaging system are described in more detail in U.S. application Ser. No. 13/144,499, "Improving the depth of field in an imaging system"; U.S. application Ser. No. 13/392,101, "Reducing noise in a color image"; U.S. application Ser. No. 13/579,568, "Processing multi-aperture image data"; U.S. application Ser. No. 13/579,569, "Processing multi-aperture image data"; and U.S. application Ser. No. 13/810,227, "Flash system for multi-aperture imaging." All of the foregoing are incorporated by reference herein in their entirety.

In one example, the multi-aperture imaging system allows a simple mobile phone camera with a typical f-number of 2 (e.g. focal length of 3 mm and a diameter of 1.5 mm) to improve its DOF via a second aperture with a f-number varying e.g. between 6 for a diameter of 0.5 mm up to 15 or more for diameters equal to or less than 0.2 mm. The f-number is defined as the ratio of the focal length f and the effective diameter of the aperture. Preferable implementations include optical systems with an f-number for the visible aperture of approximately 2 to 4 for increasing the sharpness of near objects, in combination with an f-number for the infrared aperture of approximately 16 to 22 for increasing the sharpness of distance objects.

The multi-aperture imaging system may also be used for generating depth information for the captured image. The DSP 180 of the multi-aperture imaging system may include at least one depth function, which typically depends on the parameters of the optical system and which in one embodiment may be determined in advance by the manufacturer and stored in the memory of the camera for use in digital image processing functions.

If the multi-aperture imaging system is adjustable (e.g., a zoom lens), then the depth function typically will also include the dependence on the adjustment. For example, a fixed lens camera may implement the depth function as a lookup table, and a zoom lens camera may have multiple lookup tables corresponding to different focal lengths, possibly interpolating between the lookup tables for intermediate focal lengths. Alternately, it may store a single lookup table for a specific focal length but use an algorithm to scale the lookup table for different focal lengths. A similar approach may be used for other types of adjustments, such as an adjustable aperture. In various embodiments, when determining the distance or change of distance of an object from the camera, a lookup table or a formula provides an estimate of the distance based on one or more of the following parameters: the blur kernel providing the best match between IR and RGB image data; the f-number or aperture size for the IR imaging; the f-number or aperture size for the RGB imaging; and the focal length. In some imaging systems, the physical aperture is constrained in size, so that as the focal length of the lens changes, the f-number changes. In this case, the diameter of the aperture remains unchanged but the f-number changes. The formula or lookup table could also take this effect into account.

In certain situations, it is desirable to control the relative size of the IR aperture and the RGB aperture. This may be desirable for various reasons. For example, adjusting the relative size of the two apertures may be used to compensate for different lighting conditions. In some cases, it may be desirable to turn off the multi-aperture aspect. As another example, different ratios may be preferable for different object depths, or focal lengths or accuracy requirements. Having the ability to adjust the ratio of IR to RGB provides an additional degree of freedom in these situations.

Figure 3D:
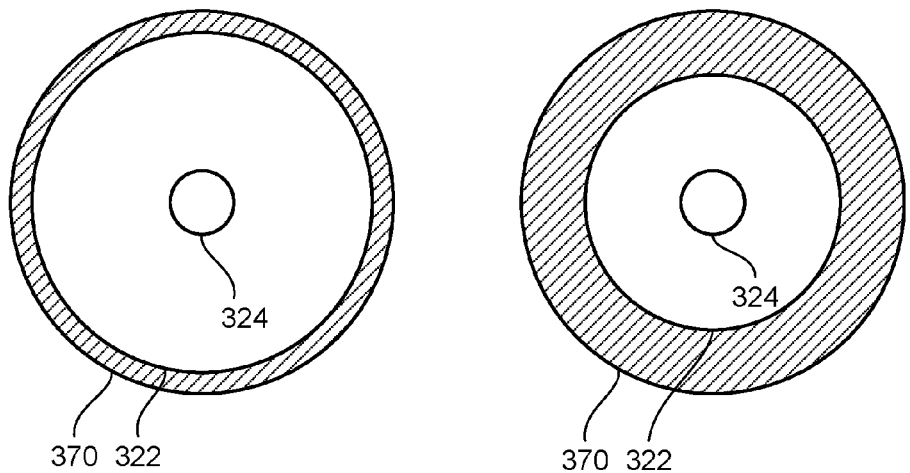
FIGS. 3D-3E depict operation of an adjustable multi-aperture imaging system according to one embodiment of the invention.
Figure 3E:
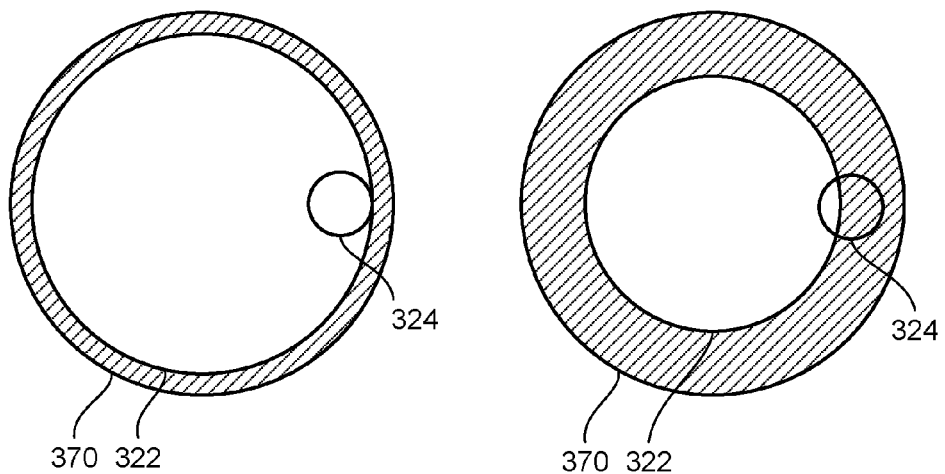

FIG. 3D is a diagram illustrating adjustment of the relative sizes of an IR aperture 324 and visible aperture 322. In this diagram, the hashed annulus is a mechanical shutter 370. On the lefthand side, the mechanical shutter 370 is fully open so that the visible aperture 322 has maximum area. On the righthand side, the shutter 370 is stopped down, so that the visible aperture 322 has less area but the IR aperture 324 is unchanged so that the ratio between visible and IR can be adjusted by adjusting the mechanical shutter 370. In FIG. 3E, the IR aperture 324 is located near the edge of the visible aperture 322. Stopping down the mechanical shutter 370 reduces the size (and changes the shape) of the IR aperture 324 and the dual-aperture mode can be eliminated by stopping the shutter 370 to the point where the IR aperture 324 is entirely covered. Similar effects can be implemented by other mechanisms, such as adjusting electronic shuttering or exposure time.

As described above in FIGS. 3A-3C, a scene may contain different objects located at different distances from the camera lens so that objects closer to the focal plane of the camera will be sharper than objects further away from the focal plane. A depth function may relate sharpness information for different objects located in different areas of the scene to the depth or distance of those objects from the camera. In one embodiment, a depth function is based on the sharpness of the color image components relative to the sharpness of the infrared image components.

Here, the sharpness parameter may relate to the circle of confusion, which corresponds to the blur spot diameter measured by the image sensor. As described above in FIGS. 3A-3C, the blur spot diameter representing the defocus blur is small (approaching zero) for objects that are in focus and grows larger when moving away to the foreground or background in object space. As long as the blur disk is smaller than the maximum acceptable circle of confusion, it is considered sufficiently sharp and part of the DOF range. From the known DOF formulas it follows that there is a direct relation between the depth of an object, e.g. its distance s from the camera, and the amount of blur or sharpness of the captured image of that object. Furthermore, this direct relation is different for the color image than it is for the infrared image, due to the difference in apertures and f-numbers.

Hence, in a multi-aperture imaging system, the increase or decrease in sharpness of the RGB components of a color image relative to the sharpness of the IR components in the infrared image is a function of the distance to the object. For example, if the lens is focused at 3 meters, the sharpness of both the RGB components and the IR components may be the same. In contrast, due to the small aperture used for the infrared image for objects at a distance of 1 meter, the sharpness of the RGB components may be significantly less than those of the infrared components. This dependence may be used to estimate the distances of objects from the camera.

In one approach, the imaging system is set to a large ("infinite") focus point. That is, the imaging system is designed so that objects at infinity are in focus. This point is referred to as the hyperfocal distance H of the multi-aperture imaging system. The system may then determine the points in an image where the color and the infrared components are equally sharp. These points in the image correspond to objects that are in focus, which in this example means that they are located at a relatively large distance (typically the background) from the camera. For objects located away from the hyperfocal distance H (i.e., closer to the camera), the relative difference in sharpness between the infrared components and the color components will change as a function of the distance s between the object and the lens.

The sharpness may be obtained empirically by measuring the sharpness (or, equivalently, the blurriness) for one or more test objects at different distances s from the camera lens. It may also be calculated based on models of the imaging system. In one embodiment, sharpness is measured by the absolute value of the high-frequency infrared components in an image. In another approach, blurriness is measured by the blur size or point spread function (PSF) of the imaging system.

Figures 4, 5:
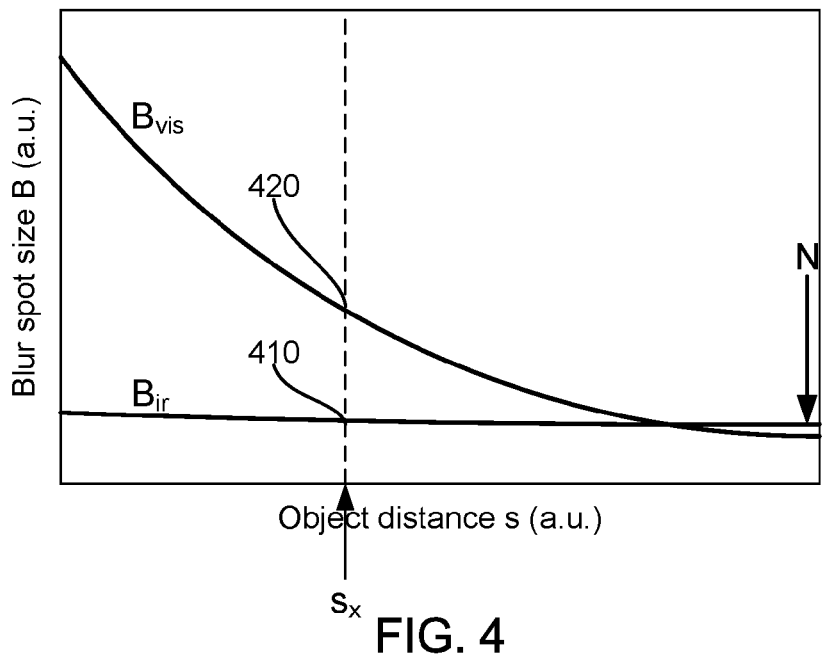
FIG. 4 is a plot of the blur spot sizes $B_{vis}$ and $B_{ir}$ of visible and infrared images, as a function of object distance s.
FIG. 5 is a table of blur spot and blur kernel as a function of object distance s.

FIG. 4 is a plot of the blur spot sizes $B_{vis}$ and $B_{ir}$ of the visible and infrared images, as a function of object distance s. FIG. 4 shows that around the focal distance N, which in this example is the hyperfocal distance, the blur spots are the smallest. Away from the focal distance N, the color components experience rapid blurring and rapid increase in the blur spot size $B_{vis}$. In contrast, as a result of the relatively small infrared aperture, the infrared components do not blur as quickly and, if the f-number is slow enough, the blur spot size $B_{ir}$ may be approximated as constant in size over the range of depths considered.

Now consider the object distance $s_x$. At this object distance, the infrared image is produced with a blur spot 410 and the visible image is produced with a blur spot 420. Conversely, if the blur spot sizes were known, or the ratio of the blur spot sizes were know, this information could be used to estimate the object distance $s_x$. Recall that the blur spot, also referred to as the point spread function, is the image produced by a single point source. If the object were a single point source, then the infrared image will be a blur spot of size 410 and the corresponding visible image will be a blur spot of size 420.

FIG. 5 illustrates one approach to estimating the object distance based on the color and infrared blur spots. FIG. 5 is a table of blur spot as a function of object distance s. For each object distance $s_k$, there is shown a corresponding IR blur spot ($PSF_{ir}$) and color blur spot ($PSF_{vis}$). The IR image $I_{ir}$ is the convolution of an ideal image $I_{ideal}$ with $PSF_{ir}$, and the color image $I_{vis}$ is the convolution of the ideal image $I_{ideal}$ with $PSF_{vis}$.

$$I_{ir} = I_{ideal} * PSF_{ir} \quad (1)$$

$$I_{vis} = I_{ideal} * PSF_{vis} \quad (2)$$

where * is the convolution operator. Manipulating these two equations yields $$I_{vis} = I_{ir} * B \quad (3)$$

where B is a blur kernel that accounts for deblurring of the IR image followed by blurring of the visible image. The blur kernels B can be calculated in advance or empirically measured as a function of object depth s, producing a table as shown in FIG. 5.

In FIG. 5, the blur kernel B is shown as similar in size to the visible blur spot $PSF_{vis}$. Under certain circumstances, the IR blur spot $PSF_{ir}$ may be neglected or otherwise accounted for. For example, if the IR blur spot is small relative to the visible blur spot $PSF_{vis}$, then neglecting the effect of the IR blur may be negligible. As another example, if the IR blur spot does not vary significantly with object distance, then it may be neglected for purposes of calculating the blur kernel B, but may be accounted for by a systematic adjustment of the results.

Figure 6A:
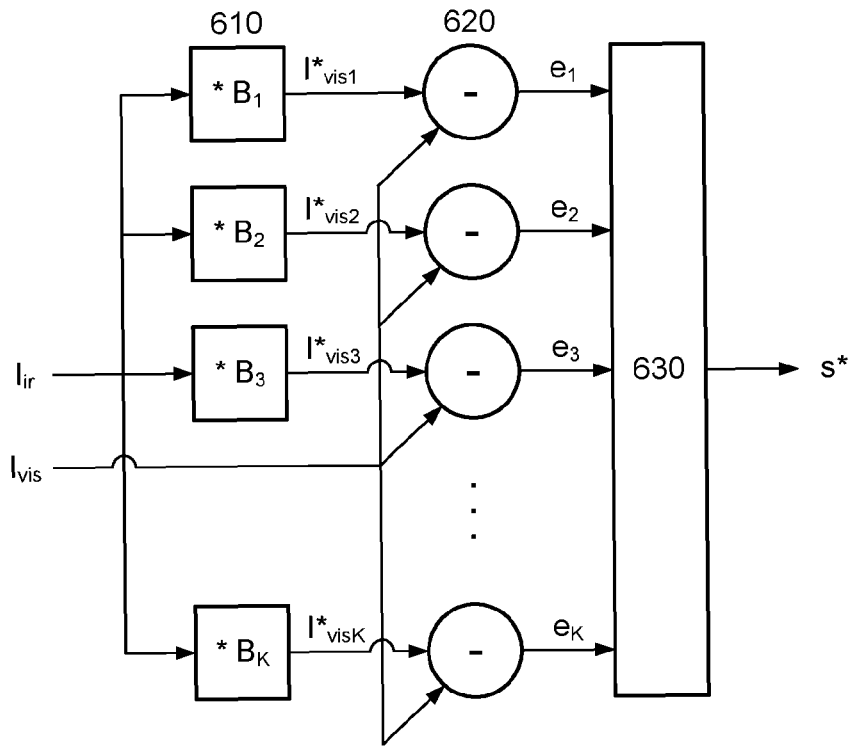
FIG. 6A is a diagram illustrating one approach to estimating object distance s.

FIG. 6A is a diagram illustrating a method for producing an estimate s* of the object distance s using a bank 610 of blur kernels $B_k$. The infrared image $I_{ir}$ is blurred by each of the blur kernels $B_k$ in the bank. In this example, the blurring is accomplished by convolution, although faster approaches will be discussed below. This results in estimated visible images $I^*_{vis}$. Each of these estimated images $I^*_{vis}$ is compared 620 to the actual visible image $I_{vis}$. In this example, the comparison is a sum squared error $e_k$ between the two images.

Figure 6B:
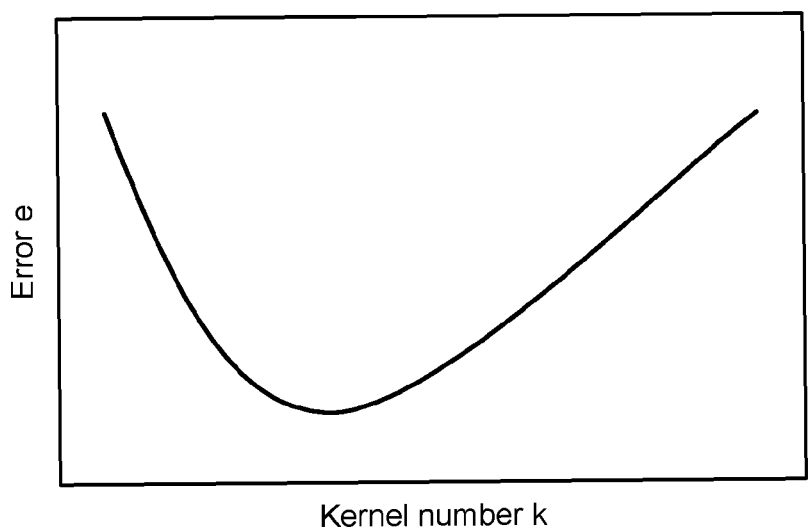
FIG. 6B is a graph of error e as a function of kernel number k for the architecture of FIG. 6A.

FIG. 6B is a graph of error e as a function of kernel number k for the architecture of FIG. 6A. Recall that each kernel number k corresponds to a specific object distance s. The error metrics e are processed 630 to yield an estimate s* of the object distance. In one approach, the minimum error $e_k$ is identified, and the estimated object distance s* is the object depth $s_k$ corresponding to the minimum error $e_k$. Other approaches can also be used. For example, the functional pairs $(s_k, e_k)$ can be interpolated for the value of s that yields the minimum e.

The infrared image $I_{ir}$ and visible image $I_{vis}$ in FIG. 6A typically are not the entire captured images. Rather, the approach of FIG. 6A can be applied to different windows within the image in order to estimate the depth of the objects in the window. In this way, a depth map of the entire image can be produced.

The approach of FIG. 6A includes a convolution for each blur kernel. If the window $I_{ir}$ and blur kernel $B_k$ are each large, the convolution can be computationally expensive. The blur kernels $B_k$ by definition will vary in size. For example, the smallest blur kernel may be 3×3 while the largest may be 25×25 or larger. In order to accommodate the largest blur kernels, the window should be at least the same size as the largest blur kernel, which means a large window size is required for a bank that includes a large blur kernel. Furthermore, the same window should be used for all blur kernels in order to allow direct comparison of the calculated error metrics. Therefore, if the bank includes a large blur kernel, a large window will be used for all blur kernels, which can lead to computationally expensive convolutions.

Figure 7A:
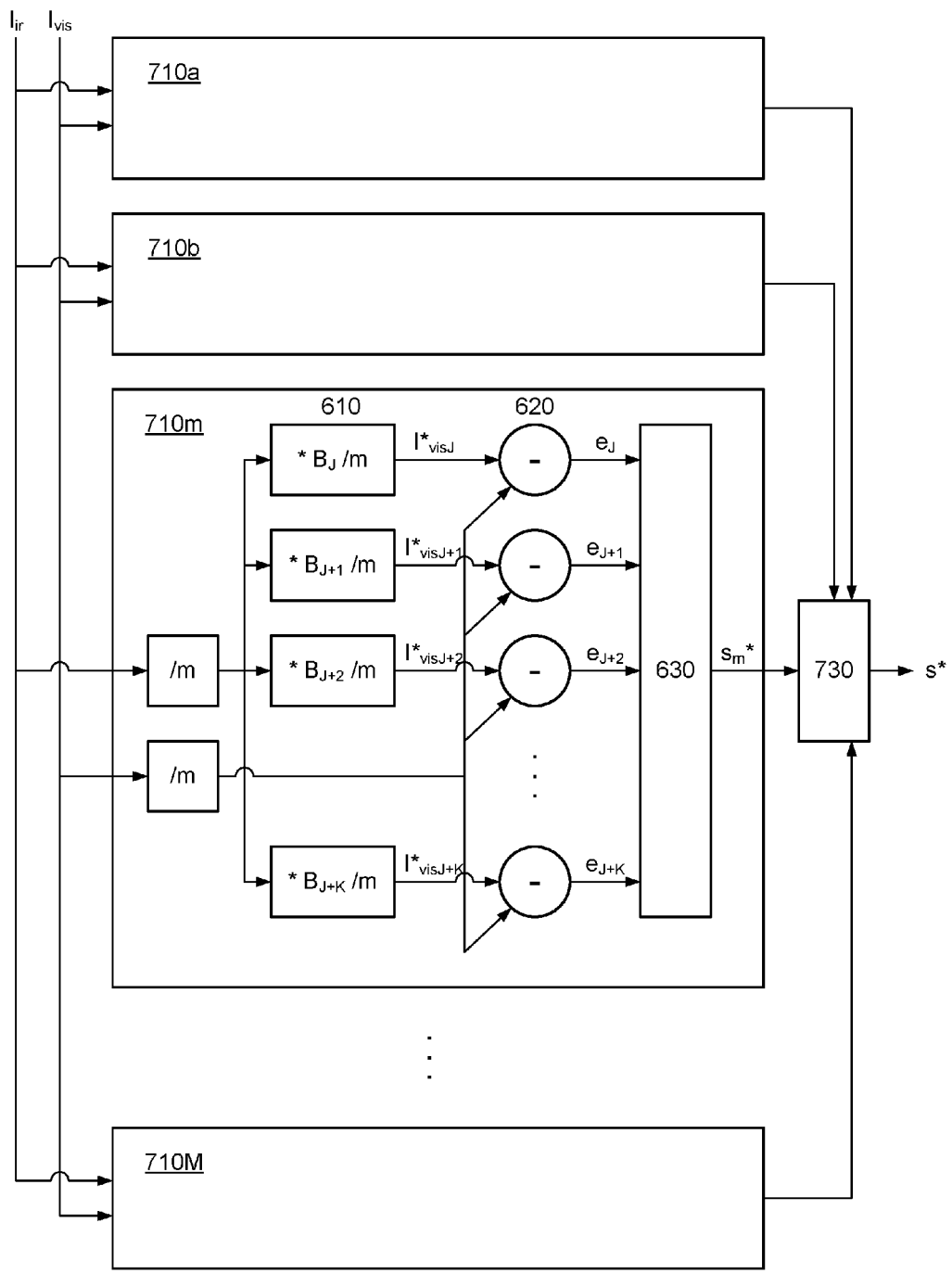
FIG. 7A is a diagram illustrating another approach to estimating object distance s.

FIG. 7A is a diagram illustrating a variation of FIG. 6A that addresses this issue. Rather than using a single bank of blur kernels, as in FIG. 6A, the approach of FIG. 7A uses multiple banks 710a-M of blur kernels. Each bank contains multiple blur kernels. However, each bank 710 is down-sampled by a different down-sampling factor. For example, bank 710a may use the smallest blur kernels and the original images without down-sampling, bank 710b may use the next smallest set of kernels but with down-sampling of 2×, and so on. In FIG. 7A, bank 710m uses down-sampling of mx. The visible image and the infrared image are also down-sampled by mx, as indicated by the boxes marked "/m". Bank 710m uses blur kernels J to (J+K), each of which is also down-sampled by mx, as indicated by the "/m" in "*$B_j$/m". Each bank 710 produces a result, for example an estimated object distance $s_m^*$ and these are combined 730 into an overall depth estimate s*.

One advantage of this approach is that down-sampled blur kernels are smaller and therefore require less computation for convolution and other operations. The table below shows a set of 9 blur kernels, ranging in size from 3×3 for blur kernel 1, to 25×25 for blur kernel 9. In the approach of FIG. 6A, blur kernel 9 would be 25×25 with a corresponding number of multiply-accumulates used to implement convolution. In contrast, in the table below, all blur kernels are down-sampled so that no convolution uses a kernel larger than 5×5.

TABLE 1

| Kernel number (k) | Size of blur kernel | Down-sampling factor |
|---|---|---|
| 1 | 3 × 3 | 1× |
| 2 | 5 × 5 | 2× |
| 3 | 8 × 8 | 2× |
| 4 | 11 × 11 | 3× |
| 5 | 14 × 14 | 3× |
| 6 | 17 × 17 | 4× |
| 7 | 20 × 20 | 4× |
| 8 | 23 × 23 | 5× |
| 9 | 25 × 25 | 5× |

Figure 7B:
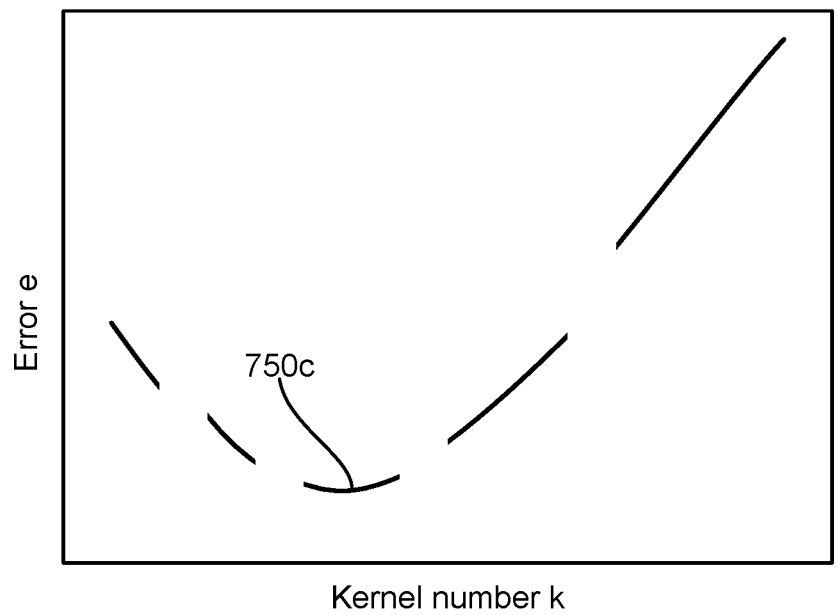
FIGS. 7B-7D are graphs of error e as a function of kernel number k for the architecture of FIG. 7A.
Figure 7C:
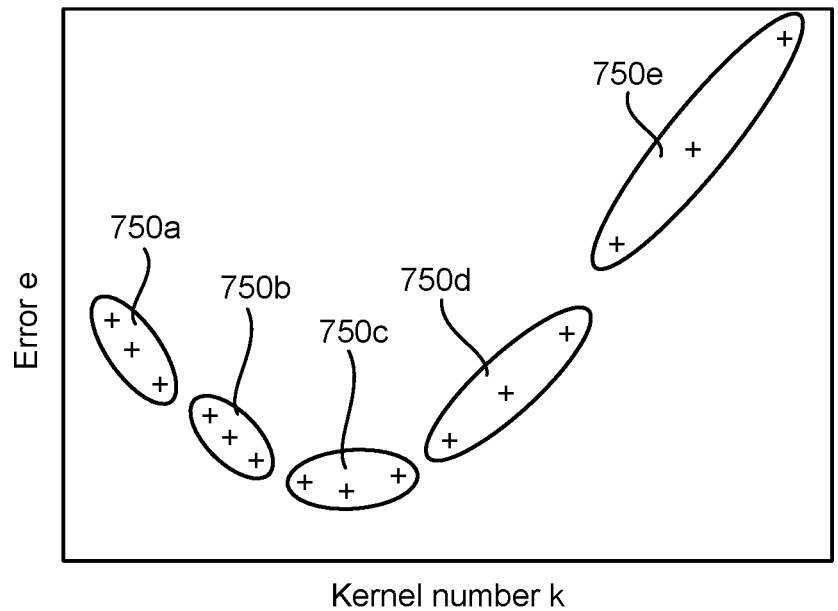

FIGS. 7B and 7C are graphs of error as a function of blur kernel number k for the architecture of FIG. 7A. If the down-sampling is performed without normalizing energies, then the error curve may exhibit discontinuities when transitioning from one bank to the next bank. FIG. 7B shows an error curve using five banks. Each piece of the curve corresponds to one of the banks. Each curve is continuous because the same down-sampling factor is used for all blur kernels in that bank. However, the down-sampling factor changes from one bank to the next so the different pieces of the curve may not align correctly. However, the minimum error can still be determined. In this example, curve 750c is the only curve that has a minimum within that curve. The other four curves are either monotonically increasing or monotonically decreasing. Therefore, the minimum error occurs within curve 750c. More sophisticated approaches may also be used. For example, differentials across the entire range of curves may be analyzed to predict the point of minimum error. This approach can be used to avoid local minima, which may be caused by noise or other effects.

In FIG. 7B, the curves are shown as continuous within each bank. However, there may be a limited number of samples for each bank. FIG. 7C is the same as FIG. 7B, except that there are only three samples for each bank. In FIG. 7C, the dashed ovals identify each of the banks. Each of the banks can be classified as monotonically increasing, monotonically decreasing or containing an extremum. In this example, banks 750a and 750b are monotonically decreasing, bank 750c contains an extremum, and banks 750d and 750e are monotonically increasing. Based on these classifications, the minimum error e occurs somewhere within bank 750c. Finer resolution sampling within bank 750c can then be performed to more accurately locate the location of the minimum value.

Figure 7D:
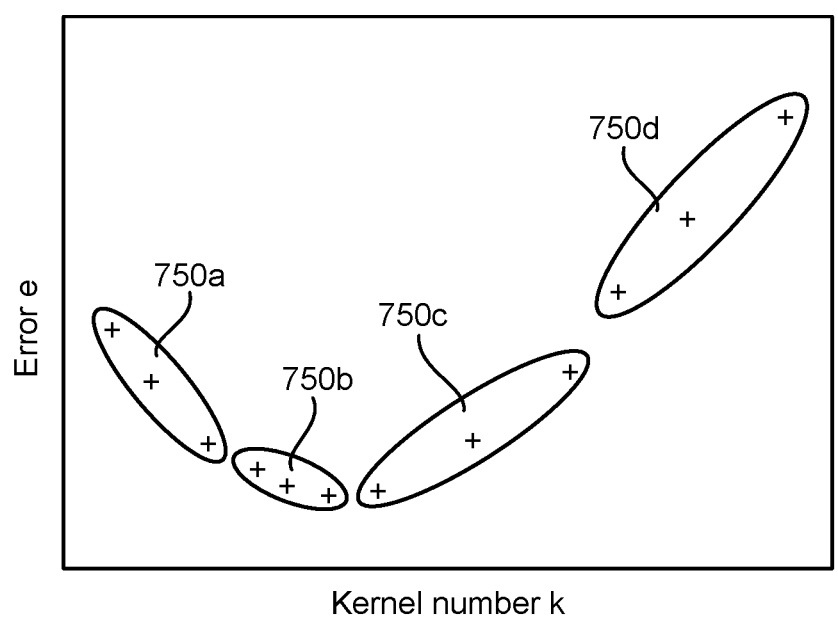

In FIG. 7D, banks 750a and 750b are monotonically decreasing, and banks 750c and 750d are monotonically increasing. There is no bank that exhibits an internal extremum based on the samples shown. However, based on the gradients for the banks, the minimum lies in the range covered by banks 750b and 750c. In this case, another bank can be constructed that spans the gap between banks 750b and 750c. That bank will then have an internal minimum.

These figures effectively illustrate different sampling approaches to find the extremum of the error function e(k). As another variation, the error function e(k) may be coarsely sampled at first in order to narrow the range of k where the minimum error e exists. Finer and finer sampling may be used as the range is narrowed. Other sampling approaches can be used to find the value of kernel number k (and the corresponding object distance) where the extremum of the error function e(k) occurs. Down-sampling can be implemented in other ways. For example, the visible images may be down-sampled first. The blur kernels are then down-sampled to match the down-sampling of the visible images. The down-sampled blur kernels are applied to the full resolution IR images. The result is an intermediate form which retains the fill resolution of the IR image but then is down-sampled to match the resolution of the down-sampled visible images. This method is not as efficient as fully down-sampling the IR but is more efficient than not using down-sampling at all. This approach may be beneficial to reduce computation while still maintaining a finer resolution.

Another aspect is that the approach of FIG. 6A depends on the content of the window. For example, a window for which the only object is a single point source object (e.g., a window containing a single star surrounded entirely by black night sky) will yield a good result because that image is a direct measure of the underlying point spread functions. Similarly, a window that contains the image of only an edge will also yield a good result because that image is a direct measure of the underlying point spread functions albeit only along one direction. At the other extreme, a window that is constant and has no features will not yield any estimate because every estimated visible image will also be a constant so there is no way to distinguish the different blur kernels. Other images may be somewhere between these extremes. Features will help distinguish the different blur kernels. Featureless areas will not and typically will also add unwanted noise.

Figure 8:
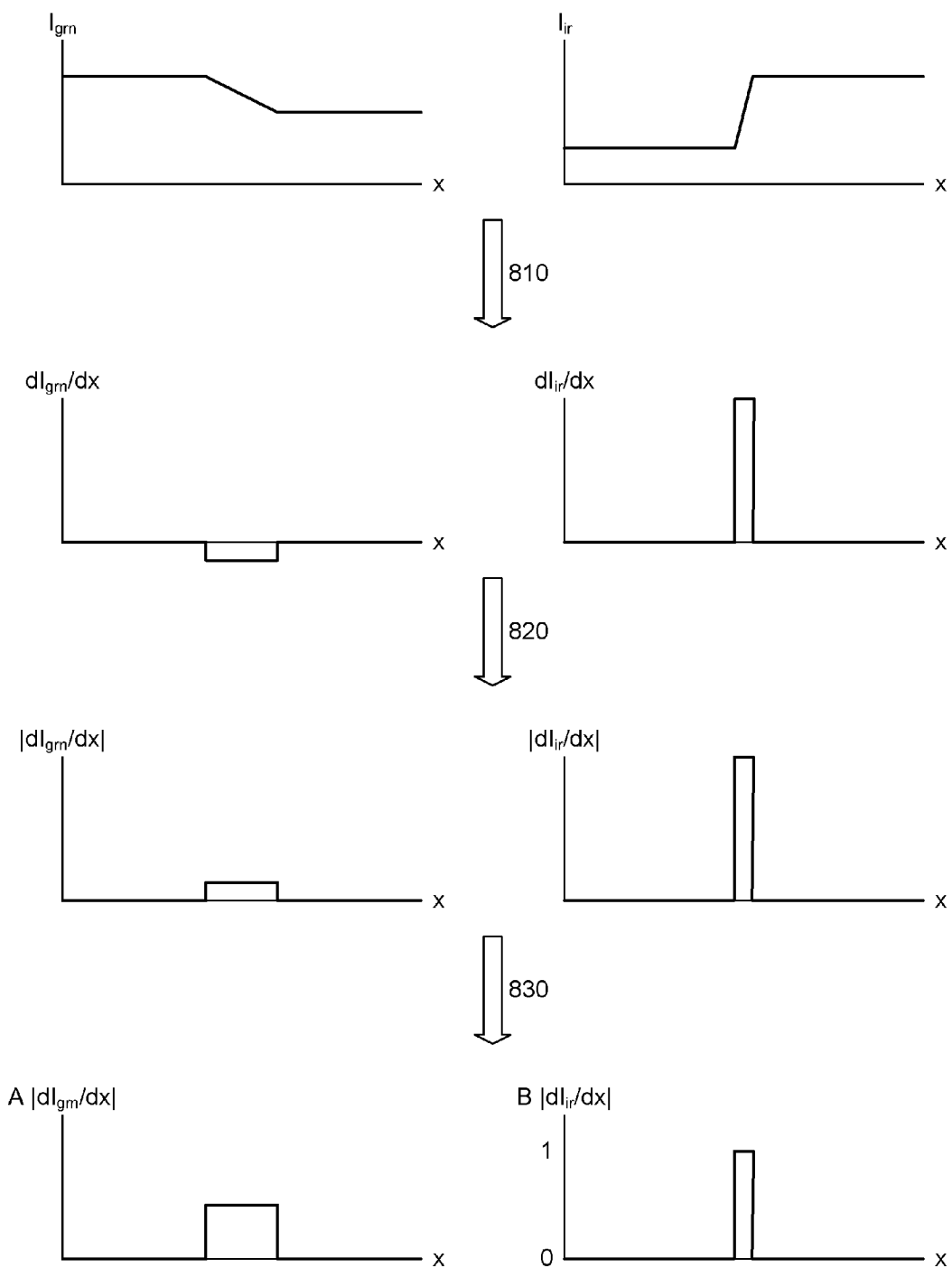
FIG. 8 is a diagram illustrating normalization of edges.

In one approach, the windows are selected to include edges. Edge identification can be accomplished using known algorithms. Once identified, edges preferably are processed to normalize variations between the different captured images. FIG. 8 shows one example. In this example, the green component $I_{gm}$ of the color image is the fast f-number image and the IR image $I_{ir}$ is the slow f-number image. The left column of FIG. 8 shows processing of the green image while the right column shows processing of the IR image. The top row shows the same edge appearing in both images. The object is not in focus so that the green edge is blurred relative to the IR edge. Also note that the edge has different phase in the two images. The green edge transitions from high to low amplitude, while the IR edge transitions from low to high amplitude. FIG. 8 shows one approach to normalize these edges to allow comparisons using blur kernels as described above.

The second row of FIG. 8 shows both edges after differentiation 810. The absolute value 820 of the derivatives is then taken, yielding the third row of FIG. 8. This effectively removes the phase mismatch between the two edges, yielding two phase matched edges. The two edges are then scaled 830, resulting in the bottom row of FIG. 8. In this example, the IR image is binarized to take on only the values 0 or 1, and the green image is scaled in amplitude to have equal energy as the IR image. The blur kernels are also scaled in amplitude so that, although a blur kernel might spread the energy in an image over a certain area, it does not increase or decrease the total energy. This then allows a direct comparison between the actual green edge and the estimated green edges calculated by applying the blur kernels to the IR edge.

Note that the IR edge looks like a line source. This is not uncommon since the IR point spread function is small and fairly constant over a range of depths, compared to the color point spread function. Also recall that in FIG. 6, the IR image is convolved with many different blur kernels. The convolution can be simplified as follows. First, the IR edge is binarized, so that the IR image is a binary image taking on only the values of 0 or 1. (In step 830 above, the color image is then scaled in amplitude to have equal energy as the binary IR image). Convolution generally requires multiplies and adds. However, when the image only takes values of 0 or 1, the multiplies are simplified. Multiplying by 0 yields all 0's so that pixels with 0 value can be ignored. Multiplying by 1 yields the blur kernel so that no actual multiplication is required. Rather, any pixel with 1 value causes an accumulation of the blur kernel centered on that pixel.

Figures 9A, 9B, 9C, 9D, 9E:
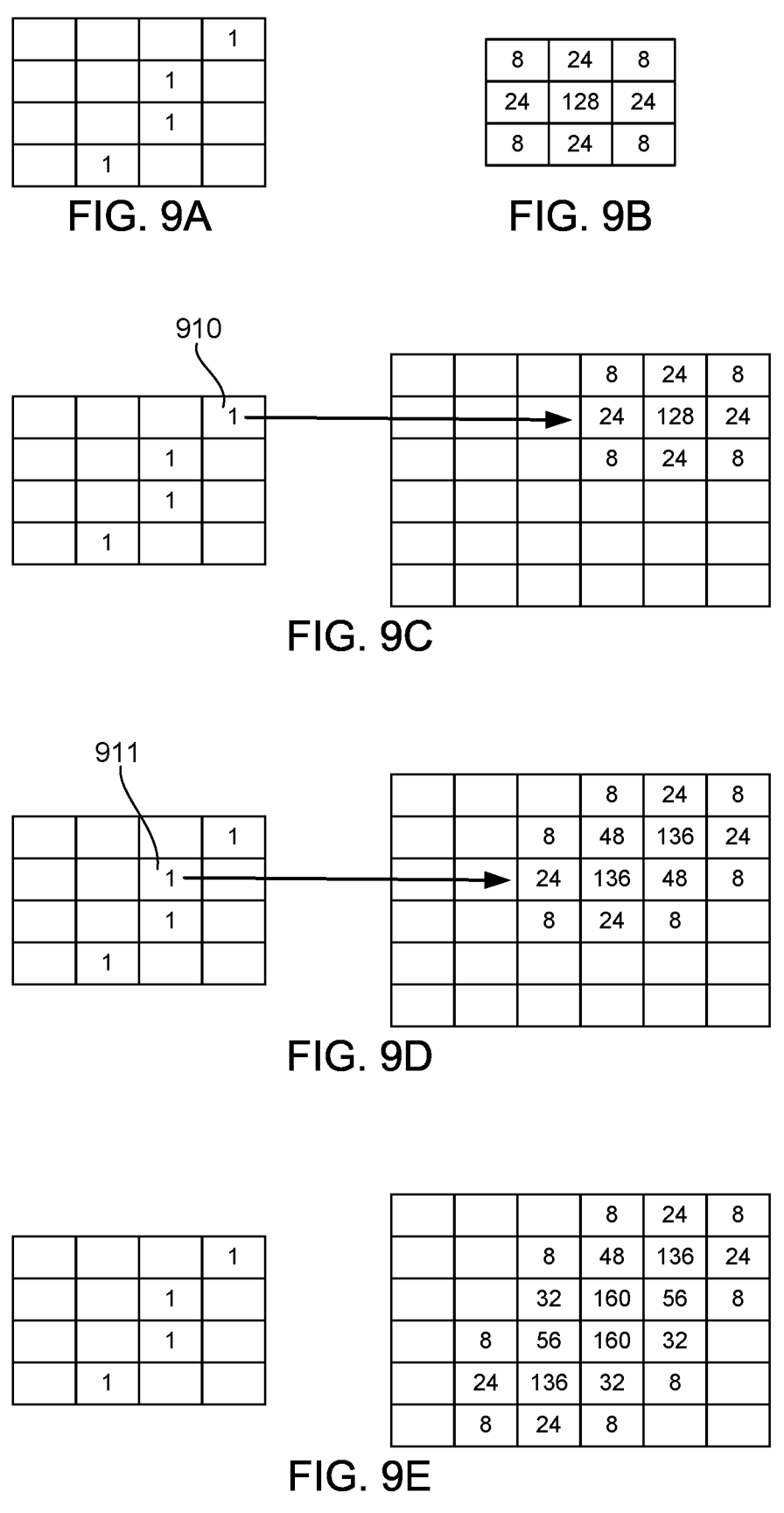

FIGS. 9A-9E illustrate this concept. FIG. 9A shows a 4×4 window with a binarized edge, where the pixels are either 1 or 0. FIG. 9B shows a 3×3 blur kernel to be convolved with the window. FIGS. 9C-9E show progression of the convolution using only adds and no multiplies. In these figures, the lefthand side shows the binarized edge of FIG. 9A and the righthand side shows progression of the convolution. In FIG. 9C, pixel 910 has been processed, meaning that the blur kernel centered on pixel 910 has been added to the moving sum on the right. In FIG. 9D, the next pixel along the edge 911 has been processed. The blur kernel centered on pixel 911 is added to the moving sum, which already contains the effect of pixel 910. The result is shown on the right. This continues for all pixels with value of 1. FIG. 9E shows the final result after all four edge pixels have been processed. This is the estimated green edge, which can then be compared to the actual green edge. If the two match well, then the blur kernel shown in FIG. 9B is the correct blur kernel for this window and can be used to estimate the object distance for this edge.

Figure 10:
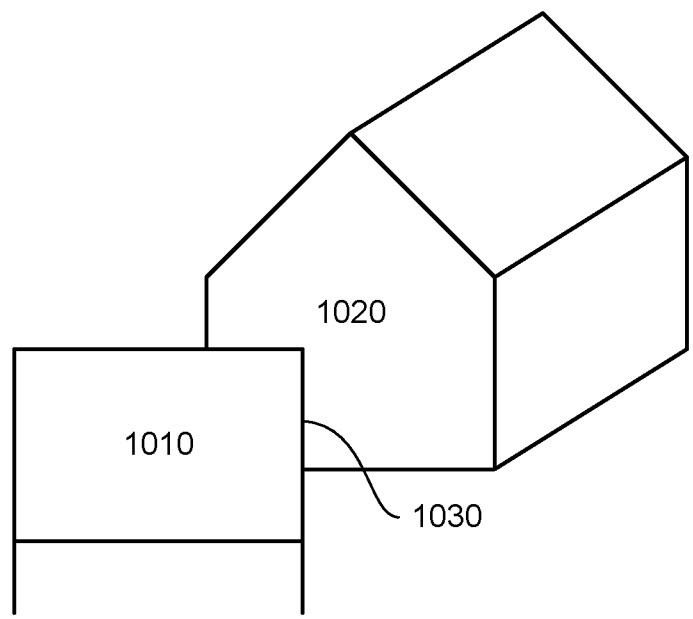
FIG. 10 is a diagram illustrating the effect of occlusion.

Edges in an image may be caused by a sharp transition within an object, for example the border between black and white squares on a checkerboard. In that case, the approach shown in FIG. 9 may be implemented using entire blur kernels. However, edges may also be caused by occlusion, when a closer object partially blocks a more distant object. In FIG. 10, the sign 1010 in the foreground partially blocks the house 1020 in the background. This creates an edge 1030 in the image. However, the left side of the edge is the sign 1010, which is at a closer object distance, and the right side of the edge is the house 1020, which is at a farther object distance. The two different object distances correspond to different blur kernels. Applying a single blur kernel to the edge will not give good results, because when one side is matched to the blur kernel, the other side will not be.

Figure 11:
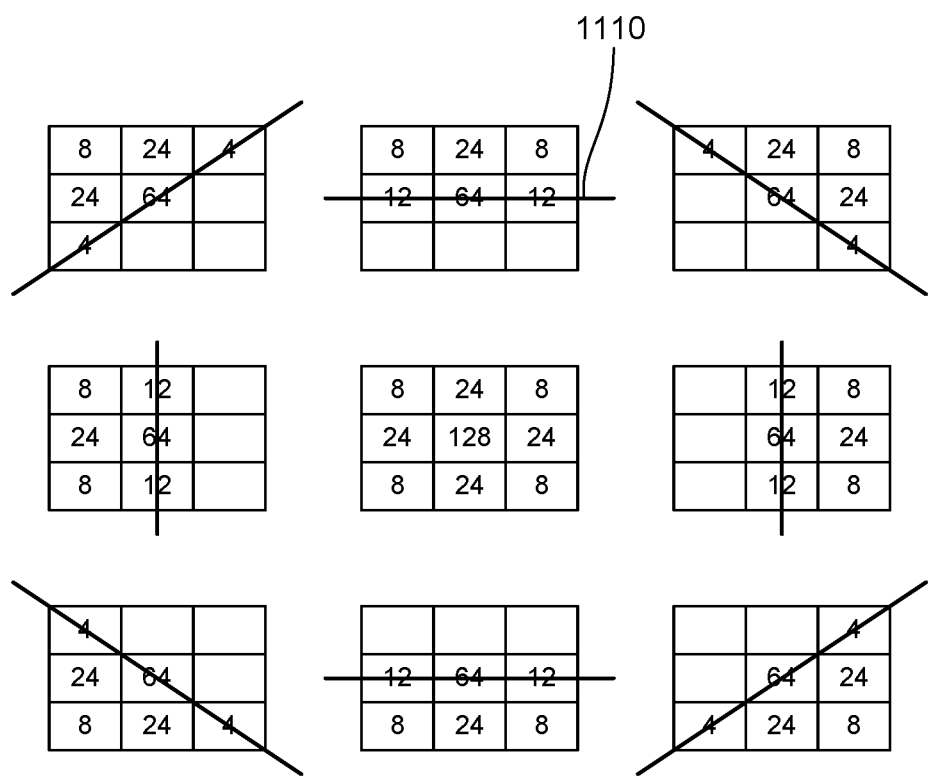
FIG. 11 is a diagram illustrating a set of single-sided blur kernels with different edge orientations.

Single-sided blur kernels can be used instead. A single-sided blur kernel is half a blur kernel instead of an entire blur kernel. FIG. 11 shows a set of eight single-sided blur kernels with different edge orientations based on the 3×3 blur kernel of FIG. 9B. The full 3×3 blur kernel is reproduced in the center of FIG. 11. Note that different single-sided blur kernels can be derived from the same full blur kernel, depending on the orientation of the edge. In FIG. 11, the solid line 1110 represents the edge. These single-sided blur kernels can be applied to binarized edges, as described above, to yield different depth estimates for each side of the edge.

Figure 12:
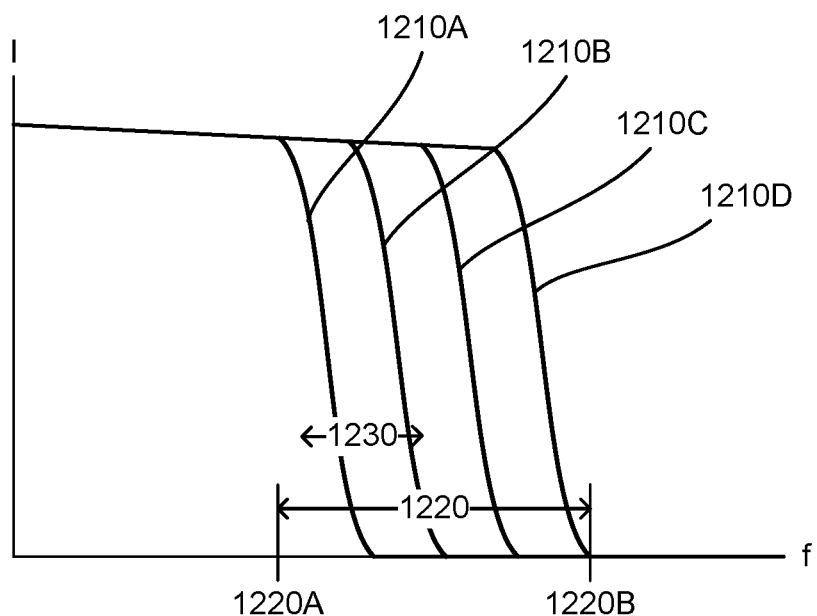
FIG. 12 is a frequency diagram illustrating the effect of frequency filtering.

FIG. 12 illustrates another aspect of the approach described above. As described above, a bank of blur kernels of varying sizes is used to estimate the object depth. Blur kernels effectively act as low pass filters. Larger blur kernels cause more blurring and therefore have lower cutoff frequencies compared to smaller blur kernels. FIG. 12 shows a generalized frequency response for a bank of blur kernels. Blur kernel 1210A is the low pass filter with the lowest cutoff frequency in the bank, which corresponds to the blur kernel with the largest blur size. Blur kernel 1210B is the second largest blur kernel and so on to blur kernel 1210D, which has the highest cutoff frequency and smallest blur size. The IR image is blurred by each of these blur kernels, and the results are compared to determine which blur kernel corresponds to the object depth.

However, note that the blur kernels 1210A-D differ only within the frequency range 1220. Outside this frequency range 1220, all of the blur kernels 1210A-D in the bank have the same behavior. Therefore, content outside the frequency range 1220 will not distinguish between the different blur kernels 1210A-D. However, that content will add to background noise. Therefore, in one approach, frequency filtering is added to reduce energy and noise from outside the frequency range 1220. In one approach, the original images are frequency filtered. In another approach, the blur kernels may be frequency filtered versions. The frequency filtering may be low pass filtering to reduce frequency content above frequency 1220B, high pass filtering to reduce frequency content below frequency 1220A, or bandpass filtering to reduce both the low frequency and high frequency content. The filtering may take different forms and may be performed regardless of whether down-sampling is also used. When it is used, down-sampling is a type of low pass filtering.

The filtering may also be applied to less than or more than all the blur kernels in a bank. For example, a narrower bandpass filter may be used if it is desired to distinguish only blur kernels 1210A and 1210B (i.e., to determine the error gradient between blur kernels 1210A-1210B). Most of the difference between those two blur kernels occurs in the frequency band 1230, so a bandpass filter that primarily passes frequencies within that range and rejects frequencies outside that range will increase the relative signal available for distinguishing the two blur kernels 1210A and 1210B.

Window sizes and locations preferably are selected based on the above considerations, and the window size may be selected independent of the blur kernel size. For example, window size may be selected to be large enough to contain features such as edges, small enough to avoid interfering features such as closely spaced parallel edges, and generally only large enough to allow processing of features since larger windows will add more noise. The size of the blur kernel may be selected to reduce computation (e.g., by down-sampling) and also possibly in order to provide sufficient resolution for the depth estimation. As a result, the window size may be different (typically, larger) than the size of the blur kernels.

The number of windows and window locations may also be selected to contain features such as edges, and to reduce computation. A judicious choice of windows can reduce power consumption by having fewer pixels to power up and to read out, which in turn can be used to increase the frame rate. A higher frame rate may be advantageous for many reasons, for example in enabling finer control of gesture tracking.

Embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims. For example, aspects of this technology have been described with respect to different f-number images captured by a multi-aperture imaging system. However, these approaches are not limited to multi-aperture imaging systems. They can also be used in other systems that estimate depth based on differences in blurring, regardless of whether a multi-aperture imaging system is used to capture the images. For example, two images may be captured in time sequence, but at different f-number settings. Another method is to capture two or more images of the same scene but with different focus settings, or to rely on differences in aberrations (e.g., chromatic aberrations) or other phenomenon that cause the blurring of the two or more images to vary differently as a function of depth so that these variations can be used to estimate the depth.

What is claimed is:

1. A computer-implemented method for processing blurred image data, comprising:
   accessing first image data associated with a first image of an object, the first image captured using a first imaging system;
   accessing second image data associated with a second image of the object, the second image captured using a second imaging system wherein a comparison of blurring by the first imaging system and blurring by the second imaging system varies as a function of object depth;
   selecting a plurality of first windows from the first image data;
   selecting a corresponding plurality of second windows from the second image data wherein corresponding first and second windows contain a same edge in the object;
   estimating the comparison of blurring by the first and second imaging systems based on comparison of single-sided blurring of the first and second image data, wherein estimating the comparison of blurring by the first and second imaging systems comprises, for pairs of corresponding first and second windows, estimating the comparison of blurring by the first and second imaging systems based on single-sided blurring of the same edge in corresponding first and second windows, wherein for at least one of the edges, opposite sides of the edge are at different object depths; and
   generating depth information based on said estimated comparisons.

2. The computer-implemented method of claim 1, wherein the comparison of blurring by the first imaging system and blurring by the second imaging system is a comparison of blur spot size of the first imaging system and blur spot size of the second imaging system.

3. The computer-implemented method of claim 1, wherein the comparison of blurring by the first imaging system and blurring by the second imaging system is a comparison of size of one side of a blur spot of the first imaging system and size of the same side of a blur spot of the second imaging system.

4. The computer-implemented method of claim 1, wherein:
   estimating the comparison of blurring by the first and second imaging systems comprises, for pairs of corresponding first and second windows, estimating the comparison of blurring by the first and second imaging systems based on single-sided blurring on both sides of the same edge in corresponding first and second windows; and
   generating depth information based on said estimated comparisons comprises generating separate depth information for each side of the same edge based on said estimated comparisons.

5. The computer-implemented method of claim 1, wherein the different object depths are caused by occlusion.

6. The computer-implemented method of claim 1, wherein:
   estimating the comparison of blurring by the first and second imaging systems comprises determining a single-sided blur kernel that approximates single-sided blurring of the same edge in corresponding first and second windows, wherein different single-sided blur kernels correspond to different object depths; and
   generating depth information for the object comprises selected the object depth that corresponds to the determined single-sided blur kernel.

7. The computer-implemented method of claim 6, wherein different single-sided blur kernels correspond to different object depths and to different orientations of the edge.

8. The computer-implemented method of claim 6, wherein the single-sided blur kernel is half a full blur kernel.

9. The computer-implemented method of claim 6, wherein determining a single-sided blur kernel that approximates single-sided blurring of the same edge in corresponding first and second windows comprises convolving the edges using different single-sided blur kernels.

10. The computer-implemented method of claim 6, wherein estimating the comparison of single-sided blurring by the first and second imaging systems comprises:
    binarizing the same edge in corresponding first and second windows; and
    determining a single-sided blur kernel that approximates single-sided blurring of the same binarized edge in corresponding first and second windows, wherein different single-sided blur kernels correspond to different object depths.

11. The computer-implemented method of claim 6, wherein the windows include edges but do not include parallel edges that are spaced close enough to interfere with each other when blurred by the single-sided blur kernels.

12. The computer-implemented method of claim 1, wherein:
    estimating the comparison of blurring by the first and second imaging systems comprises:
    for each single-sided blur kernel from a bank of single-sided blur kernels, wherein each single-sided blur kernel corresponds to a different object depth and to a different edge orientation, and the bank of single-sided blur kernels spans a range of object depths:
        blurring the edge of the second window with the single-sided blur kernel; and
        comparing the blurred edge and the same edge of the corresponding first window; and
    generating depth information for the object comprises generating depth information for the object based on said comparisons.

13. The computer-implemented method of claim 12, wherein a size of the windows is larger than a size of the blur kernels.

14. The computer-implemented method of claim 1, wherein estimating the comparison of blurring by the first and second imaging systems comprises phase matching and equating energy in the same edges in corresponding first and second windows.

15. The computer-implemented method of claim 1, wherein the first imaging system is characterized by a first f-number and the second imaging system is characterized by a second f-number that is different than the first f-number.

16. The computer-implemented method of claim 1, wherein the first and second imaging systems are different parts of a dual-aperture imaging system, the first imaging system using a visible spectral band and characterized by a first f-number, and the second imaging system using an infrared spectral band and characterized by a second f-number that is slower than the first f-number.

17. A non-transitory computer-readable storage medium storing executable computer program instructions for processing blurred image data, the instructions executable by a processor and causing the processor to perform a method comprising:

accessing first image data associated with a first image of an object, the first image captured using a first imaging system;

accessing second image data associated with a second image of the object, the second image captured using a second imaging system wherein a comparison of blurring by the first imaging system and blurring by the second imaging system varies as a function of object depth;

selecting a plurality of first windows from the first image data;

selecting a corresponding plurality of second windows from the second image data wherein corresponding first and second windows contain a same edge in the object;

estimating the comparison of blurring by the first and second imaging systems based on comparison of single-sided blurring of the first and second image data, wherein estimating the comparison of blurring by the first and second imaging systems comprises, for pairs of corresponding first and second windows, estimating the comparison of blurring by the first and second imaging systems based on single-sided blurring of the same edge in corresponding first and second windows, wherein for at least one of the edges, opposite sides of the edge are at different object depths; and generating depth information based on said estimated comparisons.

* * * * *